(12) United States Patent
Kuehlwein

(10) Patent No.: US 6,297,922 B1
(45) Date of Patent: Oct. 2, 2001

(54) MAGNETIC RECORDING CONTROL CIRCUIT WITH CURRENT REDUCERS

(75) Inventor: Jeremy R. Kuehlwein, Woodbury, MN (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/295,154

(22) Filed: Apr. 20, 1999

Related U.S. Application Data

(60) Provisional application No. 60/082,427, filed on Apr. 20, 1998.

(51) Int. Cl.[7] .................................. G11B 5/02; G11B 5/09
(52) U.S. Cl. ................................................. 360/68; 360/46
(58) Field of Search ....................... 360/46, 68; 327/110

(56) References Cited

U.S. PATENT DOCUMENTS 5,757,215   5/1998   Schuelke et al. .................... 327/110

*Primary Examiner*—Regina Y. Neal
(74) *Attorney, Agent, or Firm*—Kinney & Lange, P.A.

(57) ABSTRACT

A magnetic recording control circuit for controlling current through a magnetic recording head includes a switch network, a signal coupler, and a current reducer. The switch network is connected to first and second magnetic recording head node regions and includes first, second, third, and fourth switches each having a variable magnitude conduction path and a control region. The signal coupler includes an input region and a plurality of output regions each connected to the control region of a corresponding switch. The current reducer is connected to the first magnetic recording head node region and shunts current away from the signal coupler.

39 Claims, 3 Drawing Sheets

MAGNETIC RECORDING CONTROL CIRCUIT WITH CURRENT REDUCERS

CROSS-REFERENCE TO RELATED APPLICATION(S)

This application claims priority from Provisional Application No. 60/082,427, filed Apr. 20, 1998 for "High Current Pulldown with Self-Timed Shutoff to Drive Writer Upper H-Switch Device" by Jeremy Kuehlwein.

BACKGROUND OF THE INVENTION

The present invention relates to a magnetizing current control circuit which operates with a magnetic recording head in a magnetic data storage and retrieval system. In particular, the present invention relates to a magnetizing current control circuit having improved switching performance, reduced power consumption and circuit component voltage breakdown prevention.

In magnetic data storage and retrieval systems, a magnetic recording head records two-logic-state data in a magnetic data storage medium such as a magnetic tape or magnetic disc. The magnetic recording head has an inductive coil with currents provided therethrough in alternate directions, representing the data, to impart a series of alternate magnetic field patterns over time to the magnetic medium moving by it. Producing alternate magnetic field patterns over time entails switching the electric current through the inductive coil between forward and reverse directions therethrough to correspond to the data. Current in the inductive coil generates a magnetic field oriented in a direction corresponding to the direction of flow through the coil; thus, reversing the direction of current reverses the orientation of the magnetic field. The magnetic fields generated by the inductive coil currents intersect the magnetic medium to polarize adjacent magnetic medium regions which in effect serve as data symbol storage positions on the medium, and so form magnetic patterns along a corresponding one of more or less concentric tracks in the medium from which an information signal can be retrieved.

Controlling the directions and magnitudes of currents through the inductive coil is the purpose of a magnetizing current control circuit. A typical magnetizing current control circuit includes a switching network and a signal coupler. The switching network is connected to the ends of the inductive coil in the magnetic recording head at first and second head nodes, and includes four switching transistors arranged as pairs with each pair member connected to a corresponding one of these head nodes. One pair is switched on directing current flow in one direction through the inductive coil with the other pair switched off and, alternatively, this latter pair is switched on to direct current flow through the inductive coil in the opposite direction with the first pair being switched off. More specifically, the switching transistors are connected to the inductive coil such that a first switching transistor is connected between a first electrical power source and the first head node, a second switching transistor is connected between the first electrical power source and the second head node, a third switching transistor is connected between the first head node and a second electrical power source, and a fourth switching transistor is connected between the second head node and the second electrical power source.

The signal coupler, which responds to input signals, provides control signals to selectively switch the four switching transistors on and off in pairs, thereby controlling the direction of current through the inductive coil. Specifically, to direct current in one direction through the inductive coil, the signal coupler switches on the first and fourth switching transistors and switches off the second and third switching transistors. Conversely, to direct current in the opposite direction through the inductive coil, the signal coupler switches off the first and fourth switching transistors and switches on the second and third switching transistors.

One principle concern in the performance of magnetizing current control circuits is the duration of time needed to complete a switching of current direction through the inductive coil which directly affects the switching rate. Switching rate, a measure of how often the magnetizing current control circuit can reverse current direction through the inductive coil per unit of time, determines the maximum linear spatial density of data along a track in the magnetic medium. Ultimately, a higher switching rate yields denser data storage and thus greater total data capacity for a magnetic medium.

A key determinant of the current reversal switching time duration is the head swing voltage, i.e. the voltage difference between the head nodes of the magnetizing current control circuit. The larger the voltage drop applied in the opposite direction across the inductive coil after a switching to reverse the current therethrough, the quicker the change in direction of current through the inductive coil. This is because the voltage-current characteristic of an inductive coil is determined by $V=Ldi/dt+R_L I$, where V is the voltage across the inductive coil, di/dt is the rate of change of current over time through the inductive coil, L is the inductance of the inductive coil, $R_L$ is the resistance of the inductive coil, and I is the current through the inductive coil. Because the inductance of the inductive coil is constant and the resistance of the inductive coil is relatively small, there is a direct relationship between the voltage impressed across the inductive coil after switching and the rate of change of current over time through the inductive coil In typical magnetizing current control circuits, the head swing voltage is equal to the voltage difference between the emitters of the first and second switching transistors. In order to create a large voltage difference between the emitters of the first and second switching transistors after a switching to reverse the current through the inductive coil, a similarly large voltage difference is applied to the bases of the first and second switching transistors. The signal coupler typically uses resistors connected between the first electrical power source and the bases of the first and second switching transistors to produce these large voltage differences. The larger the currents flowing through these resistors, the larger the head swing voltage created by the first and second switching transistors. However, larger currents also increase the power consumption of the signal coupler because these currents are DC.

After the direction of current changes through the inductive coil, the voltage difference between the emitters of the first and second switching transistors (which is equal to the head swing voltage) decreases to nearly zero while the voltage difference between the bases of the first and second switching transistors remains constant. As a result, the remainder of the large voltage difference between the bases of the first and second switching transistors is compensated by the base-emitter pn junction of either the first or second switching transistor. However, the base-emitter pn junctions of the switching transistors have a low breakdown voltage. Exceeding the breakdown voltage allows a reverse current to flow through these base-emitter pn junctions, and over time sufficiently degrades the current gain of the switching transistors, thereby reducing current to the magnetic recording head and ultimately the magnetic strength of the data it records to a magnetic medium. To avoid exceeding the breakdown voltage of these base-emitter pn junctions it is typically necessary to sacrifice switching rate by limiting head swing voltage (e.g. limiting the voltage difference between the first and second electrical power sources).

Accordingly, there is a need for a magnetizing current control circuit that, in addition to preventing breakdown of the first and second switching transistors, also increases the head swing voltage, and reduces the power consumption of the signal coupler.

BRIEF SUMMARY OF THE INVENTION

The present invention is a magnetic recording control circuit for controlling current through a magnetic recording head. A switch network is connected to first and second magnetic recording head node regions and includes first, second, third, and fourth switches each having a variable magnitude conduction path and a control region. A signal coupler includes an input region and a plurality of output regions each connected to the control region of a corresponding switch. A current reducer is connected to the first magnetic recording head node region and shunts current away from the signal coupler. In one preferred embodiment, each of the switches are bipolar junction transistors having a collector, an emitter, and a base.

DETAILED DESCRIPTION

Figure 1:
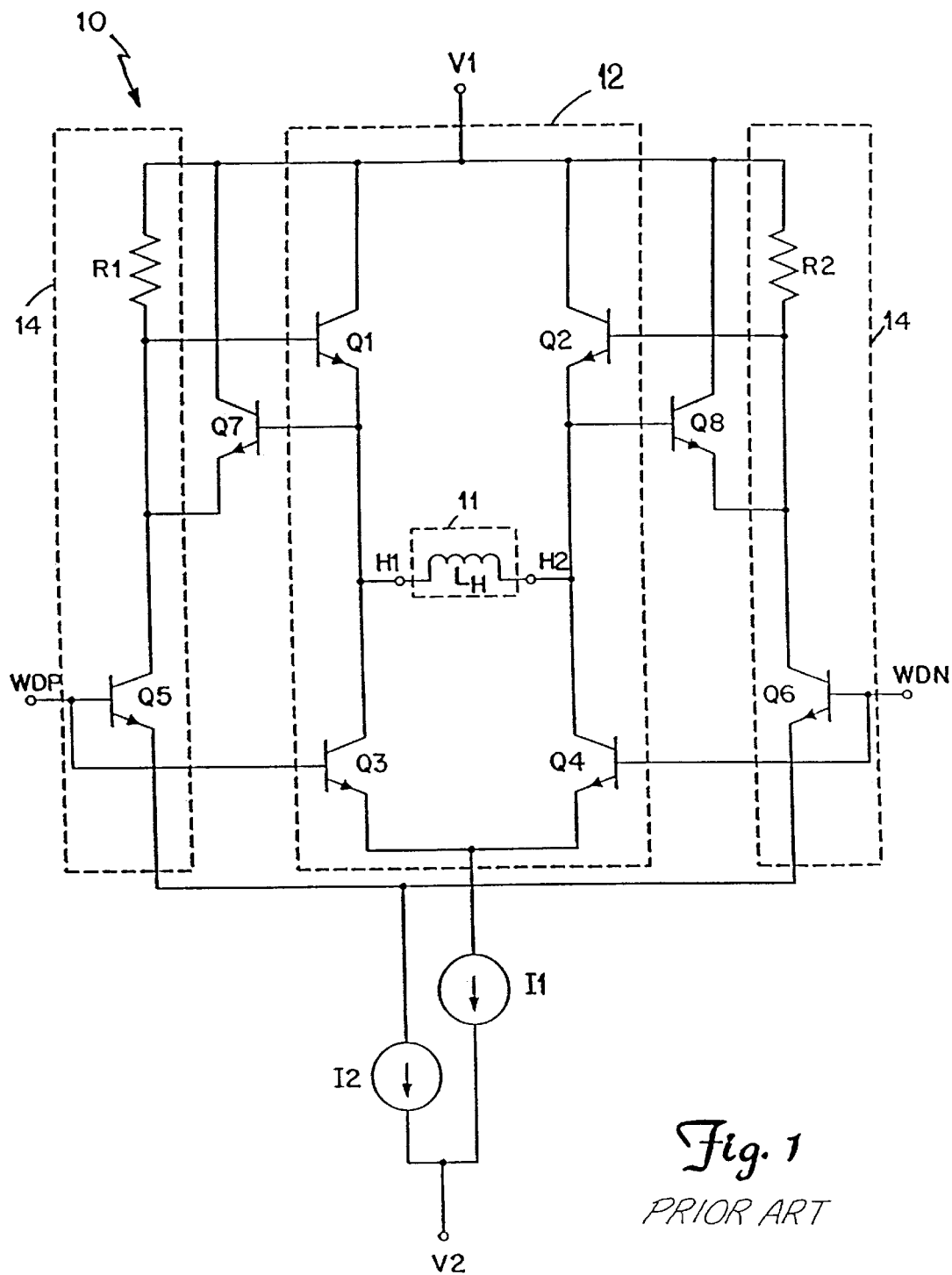
FIG. 1 shows a circuit schematic diagram of a prior art magnetic recording control circuit.

FIG. 1 shows a circuit schematic diagram of a prior art magnetic recording control circuit 10. Prior art magnetic recording control circuit 10 controls the current through a magnetic recording head 11 represented in the diagram as an inductive coil $L_H$. Prior art magnetic recording control circuit 10 includes a switching network 12, a signal coupler 14 shown in two separate sections, transistors Q7 and Q8, operating voltage source nodes V1 and V2, current generators I1 and I2, input signal circuit nodes WDP and WDN, and circuit head nodes H1 and H2.

Figure 2:
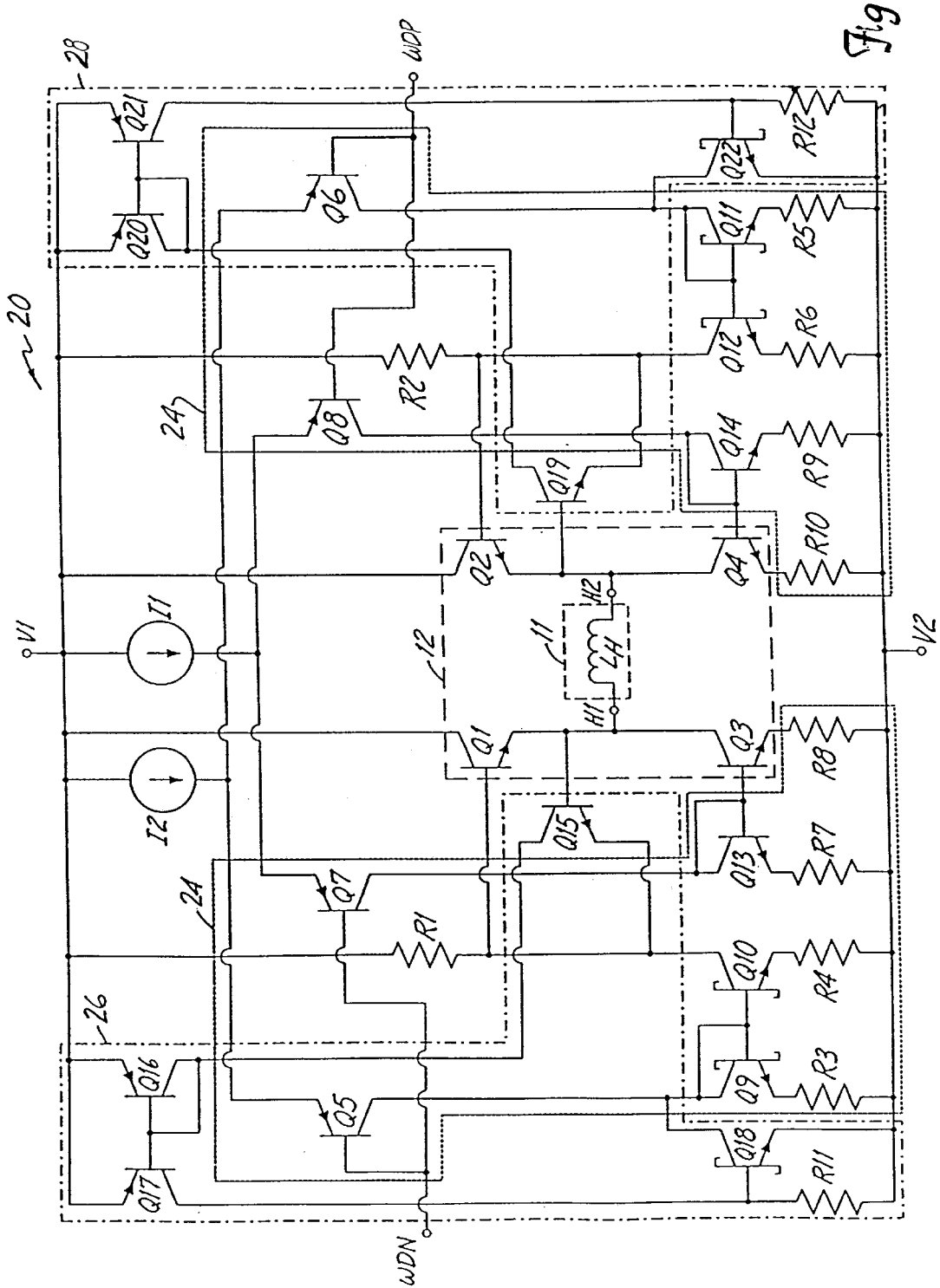
FIG. 2 shows a circuit schematic diagram of a magnetic recording control circuit embodying the present invention using only bipolar devices.

FIG. 2 shows a circuit schematic diagram of a magnetic recording control circuit 20 embodying the present invention. Magnetic recording control circuit 10 controls the magnitude and direction of current through a magnetic recording head 11 represented in the diagram as an inductive coil $L_H$. Magnetic recording head 11, which is coupled into the remainder of the circuit between circuit head nodes H1 and H2, includes inductive coil $L_H$ along with magnetic material positioned in magnetic fields generated by current therethrough. Magnetic recording control circuit 20 includes a switching network 12, a signal coupler 24 shown in two separate sections, current reducers 26 and 28, operating voltage source nodes V1 and V2, current generators I1 and I2, input signal circuit nodes WDP and WDN, and the circuit head nodes H1 and H2 previously mentioned.

Switching network 12 includes switching transistors Q1–Q4. Switching transistors Q1–Q4 are npn bipolar junction transistors each having a collector, an emitter, and a base. Each of switching transistors Q1 and Q2 has its collector connected to operating voltage source node V1 and the emitter of each is connected to a corresponding one of head nodes H1 and H2. Each of switching transistors Q3 and Q4 has its collector connected to a corresponding one of head nodes H1 and H2. The bases of switching transistors Q1–Q4 are each connected to a corresponding one of the outputs of signal coupler 24.

Signal coupler 24 includes switching transistors Q5–Q14 and resistors R1–R10. Switching transistors Q5–Q8 are pnp bipolar junction transistors each having a collector, an emitter, and a base. Switching transistors Q9–Q12 are Schottky npn transistors each having a collector, an emitter, and a base. Switching transistors Q13 and Q14 are npn bipolar junction transistors each having a collector, an emitter, and a base. Input signal node WDN is directly connected to the bases of switching transistors Q5 and Q7 and input signal node WDP is directly connected to the bases of switching transistors Q6 and Q8. Each of switching transistors Q5 and Q6 has its emitter connected to one side of current generator I2, and the collector of each is connected respectively to the collectors of switching transistors Q9 and Q11. The other side of current generator I2 is connected to operating voltage source node V1. Each of switching transistors Q7 and Q8 has its emitter connected to one side of current generator I1, and the collector of each is connected respectively to the collectors of switching transistors Q13 and Q14. The other side of current generator I1 is connected to operating voltage source node V1. Switching transistor Q9 has its collector connected to its base, its base connected to the base of switching transistor Q10 in a current mirror exhibiting gain, and its emitter connected to operating voltage source node V2 through resistor R3. Switching transistor Q10 has its collector connected to voltage source node V1 through resistor R1, and its emitter connected to voltage source node V2 through resistor R4. Resistor R3 has a higher resistance than resistor R4. Switching transistor Q11 has its collector connected to its base, its base connected to the base of switching transistor Q12 in a current mirror exhibiting gain, and its emitter connected to operating voltage source node V2 through resistor R5. Switching transistor Q12 has its collector connected to voltage source node V1 through resistor R2, and its emitter connected to voltage source node V2 through resistor R6. Resistor R5 has a higher resistance than resistor R6. Switching transistor Q13 has its collector connected to its base, its base connected to the base of switching transistor Q3 in a current mirror exhibiting gain, and its emitter connected to operating voltage source node V2 through resistor R7. Switching transistor Q14 has its collector connected to its base, its base connected to the base of switching transistor Q4 in a current mirror exhibiting gain, and its emitter connected to operating voltage source node V2 through resistor R9. The emitters of switching transistors Q3 and Q4 are connected to operating voltage source node V2 through a corresponding one of resistors R8 and R10. Resistors R7 and R9 respectively have higher resistances than resistors R8 and R10.

Current reducer 26 includes transistors Q15–Q18 and resistor R11. Transistor Q15 is an npn bipolar junction transistor with a collector, an emitter, and a base. Transistors Q16 and Q17 are pnp bipolar junction transistors with a collector, an emitter, and a base together forming a current mirror. Transistor Q18 is a Schottky npn transistor with a collector, an emitter, and a base. Transistor Q15 has its collector connected to the collector of transistor Q16, its base connected to head node H1, and its emitter connected to the collector of switching transistor Q10. Transistor Q16 has its collector connected to its base, its base connected to the base of transistor Q17, and its emitter connected to operating voltage source node V1. Transistor Q17 has its emitter connected to operating voltage source node V1, and its collector connected to operating voltage source node V2 through resistor R11. Transistor Q18 has its collector connected to the collector of switching transistor Q5, its base connected to the collector of transistor Q17, and its emitter connected to operating voltage source node V2.

Current reducer 28 includes transistors Q19–Q22 and resistor R12. Transistor Q19 is an npn bipolar junction transistor with a collector, an emitter, and a base. Transistors Q20 and Q21 are pnp bipolar junction transistors with a collector, an emitter, and a base together forming a current mirror. Transistor Q22 is a Schottky npn transistor with a collector, an emitter, and a base. Switching transistor Q19 has its collector connected to the collector of switching transistor Q20, its base connected to head node H2, and its emitter connected to the collector of switching transistor Q12. Switching transistor Q20 has its collector connected to its base, its base connected to the base of switching transistor Q21, and its emitter connected to operating voltage source node V1. Switching transistor Q21 has its emitter connected to operating voltage source node V1, and its collector connected to operating voltage source node V2 through resistor R12. Switching transistor Q22 has its collector connected to the collector of switching transistor Q6, its base connected to the collector of switching transistor Q21, and its emitter connected to operating voltage source node V2.

In an initial input signal situation chosen for purposes of description, input signal node WDN has a significantly higher voltage than input signal node WDP, for example. In the steady state in this situation, switching transistors Q5, Q7, Q9, Q10 and Q13 in signal coupler 24 will be found to be turned off, switching transistors Q6, Q8, Q11, Q12 and Q14 in signal coupler 24 will be found to be turned on, switching transistors Q1 and Q4 in switching network 12 will be found to be turned on, switching transistors Q2 and Q3 in switching network 12 will be found to be turned off, transistors Q15–Q18 in current reducer 26 will be found to be turned off, and transistors Q19–Q22 in current reducer 28 will be found to be turned on. The voltages at head nodes H1 and H2 will be found to be approximately V1−VBE, as the base current of switching transistor Q1 is small and the resistance of inductive coil L is low (VBE is the voltage drop across the base-emitter pn junction of switching transistor Q1).

Current I1 will be found to be drawn from operating voltage source node V1, through current generator I1, through the emitter and collector of switching transistor Q8, primarily through the collector and emitter of switching transistor Q14, through resistor R9, and into operating voltage source node V2. A current approximately equal to I1R9/R10 will be found to be drawn from operating voltage source node V1, primarily through the collector and emitter of switching transistor Q1, through magnetic recording head 11 from head node H1 to H2, through the collector and emitter of switching transistor Q4, through resistor R10, and into operating voltage source node V2. Current I2 will be found to be drawn from operating voltage source node V1, through current generator I2, through the emitter and collector of switching transistor Q6, primarily through the collector and emitter of transistor Q22 as well as through the collector and emitter of switching transistor Q11 and through resistor R5, and into operating voltage source node V2. A current approximately equal to 2VBE/R2 will be found to be drawn from operating voltage source node V1 and through resistor R2 (where VBE is the voltage drop across the base-emitter pn junction of switching transistor Q1). A current approximately equal to VBE/R12 will be found to be drawn from operating voltage source node V1, primarily through the emitter and collector of transistor Q20, and through the collector and emitter of transistor Q19 (where VBE is the voltage drop across the base-emitter pn junction of transistor Q22). This current will combine with the current flowing through resistor R2 such that a current approximately equal to 2VBE/R2+VBE/R12 will be found to flow through the collector and emitter of switching transistor Q12, through resistor R6, and into operating voltage source node V2. A current approximately equal to VBE/R12 will be found to be drawn from operating voltage source node V1, primarily through the emitter and collector of transistor Q21, primarily through resistor R12, and into operating voltage source node V2.

When the input signal on nodes WDN and WDP is subsequently changed to then have a significantly higher voltage at input signal node WDP than at input signal node WDN, switching transistor Q5 in signal coupler 24 is turned on and switching transistor Q6 in signal coupler 24 is turned off, thereby causing current 12 to flow through switching transistor Q9 (because transistor Q18 remains initially still turned off as it was prior to the change at input signal nodes WDP and WDN) instead of through switching transistor Q11. This condition causes switching transistor Q9 to turn on and switching transistor Q11 to turn off. Because switching transistors Q9 and Q10 are connected as a current mirror, switching transistor Q10 is turned on and draws a current approximately equal to I2R3/R4 through resistor R1 (because transistors Q15 and Q16 remain initially still turned off as they were prior to the change at input signal nodes WDP and WDN), causing the voltage at the base of switching transistor Q1 to initially drop to approximately V1−R1I2R3/R4. Also, because switching transistors Q11 and Q12 are connected as a current mirror, switching transistor Q12 is turned off and reduces the current drawn through resistor R2, causing the voltage at the base of switching transistor Q2 to rise toward operating source voltage V1. In addition, with switching transistor Q12 turned off, the current through transistors Q19 and Q20 becomes zero and as a result, transistors Q19 and Q20 are turned off. Because transistors Q20 and Q21 are connected as a current mirror, transistor Q21 is turned off and the current through resistor R12 becomes zero. With the voltage at the base of transistor Q22 equal to operating source voltage V2, transistor Q22 is turned off because the voltage at the base of transistor Q22 is no longer a VBE higher than the voltage at its emitter.

Also in this input signal situation, switching transistor Q7 in signal coupler 24 is turned on and switching transistor Q8 in signal coupler 24 is turned off, thereby causing current I1 to flow through switching transistor Q13 instead of switching transistor Q14. This condition causes switching transistor Q13 to turn on and switching transistor Q14 to turn off. Because switching transistor Q13 and Q3 are connected as a current mirror, switching transistor Q3 is turned on and draws a current approximately equal to I1R7/R8. Also, because switching transistors Q14 and Q4 are connected as a current mirror, switching transistor Q4 is turned off. With switching transistor Q3 turned on and the voltage at the base of switching transistor Q1 (which remains initially still turned on as it was prior to the change at input signal nodes WDP and WDN) approximately V1−R1I2R3/R4, the voltage at the emitter of switching transistor Q1 is approximately V1−R1I2R3/R4−VBE, where VBE is the voltage drop across the base-emitter pn junction of switching transistor Q1. In addition, when the voltage at the base of switching transistor Q2 is approximately at operating source voltage V1, switching transistor Q2 is turned on because the base of switching transistor Q2 is then a VBE higher than the voltage at its emitter (which is equal to the voltage at head node H2).

Because the voltage at head node H1 (which is equal to the voltage at the emitter of switching transistor Q1) is approximately V1−R1I2R/R4−VBE and the voltage at head node H2 is approximately V1−VBE, a voltage drop of approximately R1I2R3/R4 volts is initially created across inductive coil $L_H$ from head node H2 to H1. As a result, the current through inductive coil $L_H$ (which, prior to the change at input signal nodes WDP and WDN, was flowing through inductive coil $L_H$ from head node H1 to H2) will follow the change in polarity across inductive coil $L_H$ and ultimately change direction and flow through inductive coil $L_H$ from head node H2 to H1.

After the change in direction of current through inductive coil $L_H$ so that a current approximately equal to I1R7/R8 now flows from head node H2 to H1, the voltage at head node H1 will rise to nearly the voltage at head node H2. This is because once the direction of the current through inductive coil $L_H$ is established, the rate of change of the current will decrease to nearly zero because the resistance of inductive coil $L_H$ is relatively small. Also, the voltage at head node H2 is held approximately constant during the remainder of this input signal situation because the voltage drop VBE across the base-emitter pn junction of switching transistor Q2 (which is turned on) is approximately constant and the voltage drop across resistor R2 is small because of the gain of switching transistor Q2. Therefore, as the voltage difference between head nodes H2 and H1 decreases to nearly zero, the voltage at head node H1 will rise to nearly the voltage at head node H2.

When the voltage at head node H1 (which is equal to the voltage at the emitter of switching transistor Q1) begins to rise from V1−R1I2R3/R4−VBE with the decreasing voltage across inductive coil $L_H$, switching transistor Q1 will be turned off because the voltage at the emitter of switching transistor Q1 is no longer a VBE lower than the voltage at its base (which is held at approximately V1−R1I2R3/R4 by switching transistor Q10 being turned on). As the voltage at head node H1 continues to rise toward V1−VBE (which is the voltage at head node H2), it will eventually be a VBE higher than the voltage at the base of switching transistor Q1. When this occurs, transistor Q15 is turned on because the voltage at the base of transistor Q15 (which is equal to the voltage at head node H1) is a VBE higher than the voltage at its emitter (which is equal to the voltage at the base of switching transistor Q1). This condition causes current to flow through transistor Q15 and turn transistor Q16 on. Because transistors Q16 and Q17 are connected as a current mirror, transistor Q17 is turned on and causes current to flow through transistor Q17 and resistor R11. As current flows through resistor R11, the voltage at the base of transistor Q18 will rise and eventually be a VBE above operating source voltage V2. When this occurs, transistor Q18 is turned on because the voltage at the base of transistor Q18 is a VBE higher than the voltage at its emitter (which is equal to operating source voltage V2).

For the remainder of this input signal situation after transistor Q18 is turned on, transistor Q18 reduces the current flowing through switching transistor Q9 and resistor R3 which in turn reduces the current drawn through resistor R1, switching transistor Q10, and resistor R4. This is because transistor Q18 has less resistance than the combination of switching transistor Q9 and resistor R3, and as a result, transistor Q18 shunts current away from switching transistor Q9 causing the current through switching transistor Q9 and resistor R3 to decrease. Because switching transistors Q9 and Q10 are connected as a current mirror, the current drawn through resistor R1, switching transistor Q10, and resistor R4 also decreases.

The current trough transistor Q9 and resistor R3 will continue to decrease and instead flow through transistor Q18 until the current through switching transistor Q10 and resistor R4 has decreased to approximately 2VBE/R1+VBE/R11. This is because after transistor Q18 is turned on, the current through transistor Q17 is approximately equal to the current through resistor R11 which is VBE/R11 (where VBE is the voltage drop across the base-emitter pn junction of transistor Q18). Because transistors Q17 and Q16 are connected as a current mirror, a current approximately equal to VBE/R11 flows through transistors Q16 and Q15. Also, after transistor Q15 is turned on, the voltage at the base of switching transistor Q1 is maintained a VBE lower than the voltage at head node H1, where VBE is the voltage drop across the base-emitter pn junction of transistor Q15. This is because initially when transistor Q15 is turned on, the rising voltage at the base of transistor Q15 forces its emitter voltage to rise through drawing an increased current through the collector and emitter of transistor Q15 to supply some of the collector current to switching transistor Q10 which reduces the current drawn through resistor R1 so that the voltage thereacross decreases. Then after transistor Q18 is turned on, the voltage at the base of switching transistor Q1 (which is equal to the voltage at the emitter of transistor Q15) continues to rise a VBE lower than the voltage at head node H1 because the current through resistor R1 is reduced by transistor Q18 shunting current away from the current mirror formed by switching transistors Q9 and Q10. As a result, when the voltage at head node H1 is nearly V1−VBE, the voltage at the base of switching transistor Q1 is approximately V1−2VBE. Because the voltage drop across resistor R1 is approximately 2VBE, the current through resistor R1 is approximately 2VBE/R1. Thus, when the current through resistor R1 combines with the current through transistor Q15, a current approximately equal to 2VBE/R1+VBE/R11 flows through switching transistor Q10 and resistor R4.

Therefore, because switching transistors Q2 and Q3 are turned on and switching transistors Q1 and Q4 are turned off with the voltage at node WDP exceeding that at node WDN, a current approximately equal to I1R7/R8 is drawn from operating voltage source node V1, primarily through the collector and emitter of switching transistor Q2, through magnetic recording head 11 from head node H2 to H1, through the collector and emitter of switching transistor Q3, through resistor R8, and into operating voltage source node V2. As described above, the current through switching transistor Q10 and resistor R4 is also reduced in this situation by current reducer 26 from approximately I2R3/R4 to approximately 2VBE/R1+VBE/R11. In addition, because current reducer 26 keeps the voltage at the emitter of switching transistor Q1 (which is equal to the voltage at head node H1) a VBE higher than the voltage at the base of switching transistor Q1, switching transistor Q1 is held off without any possibility that the breakdown voltage of the base-emitter pn junction of switching transistor Q1 will be exceeded because it is greater than a VBE.

When the input signal on nodes WDN and WDP is subsequently changed to again have a significantly higher voltage at input signal node WDN than at input signal node WDP as in the initial input signal steady state situation described above, switching transistor Q6 in signal coupler 24 is turned on and switching transistor Q5 in signal coupler 24 is turned off, thereby causing current I2 to flow through switching transistor Q11 (because transistor Q22 remains initially still turned off as it was prior to the change at input signal nodes WDP and WDN) instead of through switching transistor Q9. This condition causes switching transistor Q11 to turn on and switching transistor Q9 to turn off. Because switching transistors Q11 and Q12 are connected as a current mirror, switching transistor Q12 is turned on and draws a current approximately equal to I2R5/R6 through resistor R2 (because transistors Q19 and Q20 remain initially still turned off as they were prior to the change at input signal nodes WDP and WDN), causing the voltage at the base of switching transistor Q2 to initially drop to approximately V1−R2I2R5/R6. Also, because switching transistors Q9 and Q10 are connected as a current mirror, switching transistor Q10 is turned off and reduces the current drawn through resistor R1, causing the voltage at the base of switching transistor Q1 to rise toward operating source voltage V1 . In addition, with switching transistor Q10 turned off, the current through transistors Q15 and Q16 becomes zero and as a result, transistors Q15 and Q16 are turned off. Because transistors Q16 and Q17 are connected as a current mirror, transistor Q17 is turned off and the current through resistor R11 becomes zero. With the voltage at the base of transistor Q18 equal to operating source voltage V2, transistor Q18 is turned off because the voltage at the base of transistor Q18 is no longer a VBE higher than the voltage at its emitter.

Also in this input signal situation, switching transistor Q8 in signal coupler 24 is turned on and switching transistor Q7 in signal coupler 24 is turned off, thereby causing current I1 to flow through switching transistor Q14 instead of switching transistor Q13. This condition causes switching transistor Q14 to turn on and switching transistor Q13 to turn off. Because switching transistor Q14 and Q4 are connected as a current mirror, switching transistor Q4 is turned on and draws a current approximately equal to I1R9/R10. Also, because switching transistors Q13 and Q3 are connected as a current mirror, switching transistor Q3 is turned off. With switching transistor Q4 turned on and the voltage at the base of switching transistor Q2 (which remains initially still turned on as it was prior to the change at input signal nodes WDP and WDN) approximately V1−R2I2R5/R6, the voltage at the emitter of switching transistor Q2 is approximately V1−R2I2R5/R6−VBE, where VBE is the voltage drop across the base-emitter pn junction of switching transistor Q2. In addition, when the voltage at the base of switching transistor Q1 is approximately at operating source voltage V1, switching transistor Q1 is turned on because the base of switching transistor Q1 is then a VBE higher than the voltage at its emitter (which is equal to the voltage at head node H1).

Because the voltage at head node H2 (which is equal to the voltage at the emitter of switching transistor Q2) is approximately V1−R2I2R5/R6−VBE and the voltage at head node H1 is approximately V1−VBE, a voltage drop of approximately R2I2R5/R6 volts is initially created across inductive coil $L_H$ from head node H1 to H2. As a result, the current through inductive coil $L_H$ (which, prior to the change at input signal nodes WDP and WDN, was flowing through inductive coil $L_H$ from head node H2 to H1) will follow the change in polarity across inductive coil $L_H$ and ultimately change direction and flow through inductive coil $L_H$ from head node H1 to H2.

After the change in direction of current through inductive coil $L_H$ so that a current approximately equal to I1R9/R10 now flows from head node H1 to H2, the voltage at head node H2 will rise to nearly the voltage at head node H1. Also, the voltage at head node H1 is held approximately constant during the remainder of this input signal situation because the voltage drop VBE across the base-emitter pn junction of switching transistor Q1 (which is turned on) is approximately constant and the voltage drop across resistor R1 is small because of the gain of switching transistor Q1. Therefore, as the voltage difference between head nodes H1 and H2 decreases to nearly zero, the voltage at head node H2 will rise to nearly the voltage at head node H1.

When the voltage at head node H2 (which is equal to the voltage at the emitter of switching transistor Q2) begins to rise from V1−R2I2R5/R6−VBE with the decreasing voltage across inductive coil $L_H$, switching transistor Q2 will be turned off because the voltage at the emitter of switching transistor Q2 is no longer a VBE lower than the voltage at its base (which is held at approximately V1−R2I2R5/R6 by switching transistor Q12 being turned on). As the voltage at head node H2 continues to rise toward V1−VBE (which is the voltage at head node H1), it will eventually be a VBE higher than the voltage at the base of switching transistor Q2. When this occurs, transistor Q19 is turned on because the voltage at the base of transistor Q19 (which is equal to the voltage at head node H2) is a VBE higher than the voltage at its emitter (which is equal to the voltage at the base of switching transistor Q2). This condition causes current to flow through transistor Q14 and turn transistor Q20 on. Because transistors Q20 and Q21 are connected as a current mirror, transistor Q21 is turned on and causes current to flow through transistor Q21 and resistor R12. As current flows through resistor R12, the voltage at the base of transistor Q22 will rise and eventually be a VBE above operating source voltage V2. When this occurs, transistor Q22 is turned on because the voltage at the base of transistor Q22 is a VBE higher than the voltage at its emitter (which is equal to operating source voltage V2).

For the remainder of this input signal situation after transistor Q22 is turned on, transistor Q22 reduces the current flowing through switching transistor Q11 and resistor R5 which in turn reduces the current drawn through resistor R2, switching transistor Q12, and resistor R6. This is because transistor Q22 has less resistance than the combination of switching transistor Q11 and resistor R5, and as a result, transistor Q22 shunts current away from switching transistor Q11 causing the current through switching transistor Q11 and resistor R5 to decrease. Because switching transistors Q11 and Q12 are connected as a current mirror, the current drawn through resistor R2, switching transistor Q12, and resistor R6 also decreases.

The current through transistor Q11 and resistor R5 will continue to decrease and instead flow through transistor Q22 until the current through switching transistor Q12 and resistor R6 has decreased to approximately 2VBE/R2+VBE/R12. This is because after transistor Q22 is turned on, the current through transistor Q21 is approximately equal to the current through resistor R12 which is VBE/R12 (where VBE is the voltage drop across the base-emitter pn junction of transistor Q22). Because transistors Q21 and Q20 are connected as a current mirror, a current approximately equal to VBE/R12 flows through transistors Q20 and Q19. Also, after transistor Q19 is turned on, the voltage at the base of switching transistor Q2 is maintained a VBE lower than the voltage at head node H2, where VBE is the voltage drop across the base-emitter pn junction of transistor Q19. This is because initially when transistor Q19 is turned on, the rising voltage at the base of transistor Q19 forces its emitter voltage to rise through drawing an increased current through the collector and emitter of transistor Q19 to supply some of the collector current to switching transistor Q12 which reduces the current drawn through resistor R2 so that the voltage thereacross decreases. Then after transistor Q22 is turned on, the voltage at the base of switching transistor Q2 (which is equal to the voltage at the emitter of transistor Q19) continues to rise a VBE lower than the voltage at head node H2 because the current through resistor R2 is reduced by transistor Q22 shunting current away from the current mirror formed by switching transistors Q11 and Q12. As a result, when the voltage at head node H2 is nearly V1−VBE, the voltage at the base of switching transistor Q2 is approximately V1−2VBE. Because the voltage drop across resistor R2 is approximately 2VBE, the current through resistor R2 is approximately 2VBE/R2. Thus, when the current through resistor R2 combines with the current through transistor Q19, a current approximately equal to 2VBE/R2+VBE/R12 flows through switching transistor Q12 and resistor R6.

Therefore, because switching transistors Q1 and Q4 are turned on and switching transistors Q2 and Q3 are turned off with the voltage at node WDN exceeding that at node WDP, a current approximately equal to I1R9/R10 is drawn from operating voltage source node V1, primarily through the collector and emitter of switching transistor Q1, through magnetic recording head 11 from head node H1 to H2, through the collector and emitter of switching transistor Q4, through resistor R10, and into operating voltage source node V2. As described above, the current through switching transistor Q12 and resistor R6 is also reduced in this situation by current reducer 28 from approximately I2R5/R6 to approximately 2VBE/R2+VBE/R12. In addition, because current reducer 28 keeps the voltage at the emitter of switching transistor Q2 (which is equal to the voltage at head node H2) a VBE higher than the voltage at the base of switching transistor Q2, switching transistor Q2 is held off without any possibility that the breakdown voltage of the base-emitter pn junction of switching transistor Q2 will be exceeded because it is greater than a VBE.

Figure 3:
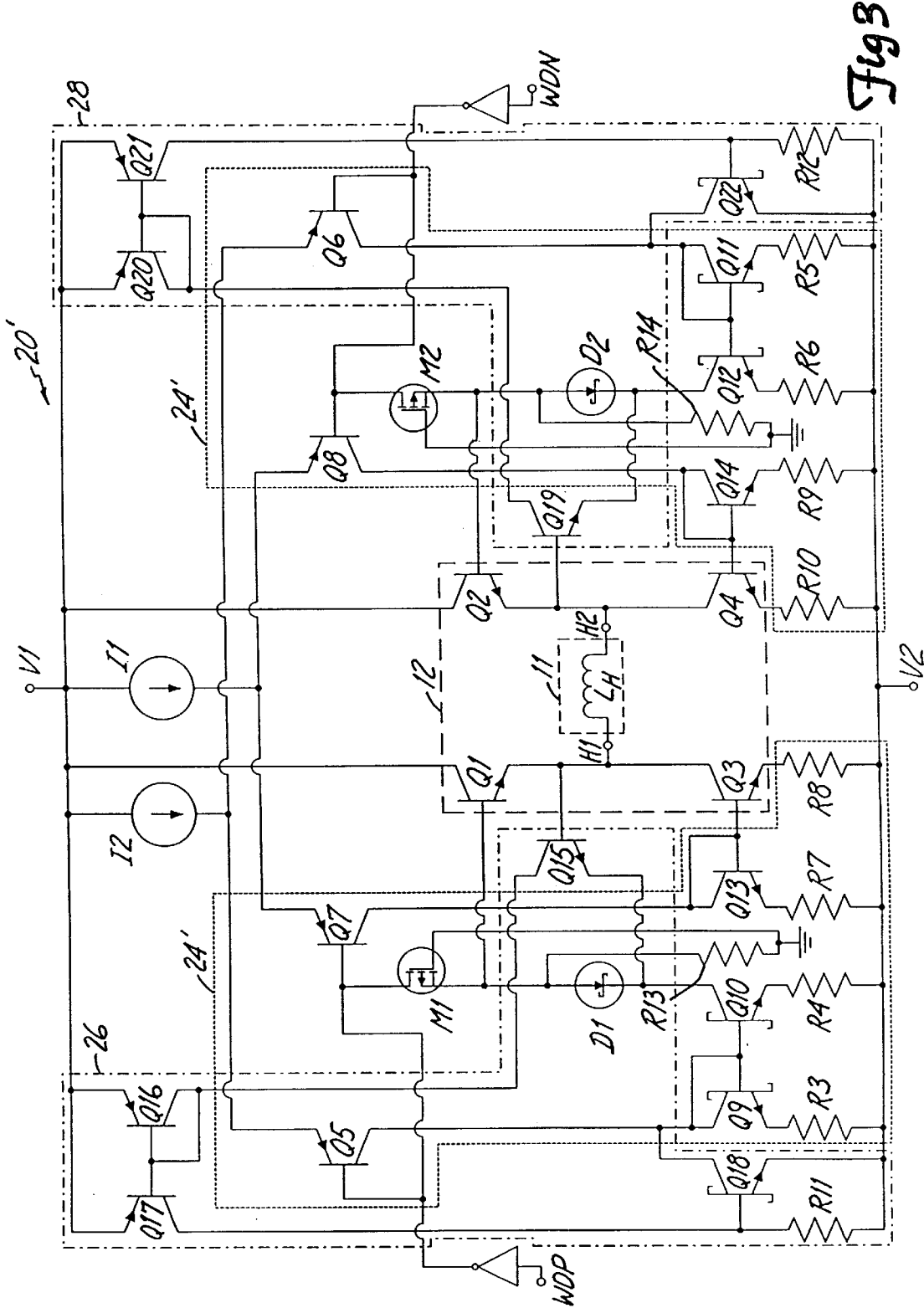
FIG. 3 shows a circuit schematic diagram of a magnetic recording control circuit embodying the present invention using bipolar and MOS devices.

FIG. 3 shows a circuit schematic diagram of an alternative embodiment of magnetic recording control circuit 20 labeled 20.

Signal coupler 24 differs from signal coupler 24 by replacing resistors R1 and R2 with transistors M1 and M2, and further including diodes D1 and D2 and resistors R13 and R14. Transistors M1 and M2 are PMOS transistors each having a source, a drain, and a gate. Diodes D1 and D2 are Schottky diodes each having an anode and a cathode. Input signal node WDP is connected to the bases of switching transistors Q5 and Q7 and the source of transistor M1 through a CMOS inverter. Input signal node WDN is connected to the bases of switching transistors Q6 and Q8 and the source of transistor M2 through a CMOS inverter. Transistor M1 has its drain connected to the base of switching transistor Q1, and its gate connected to the ground voltage reference. Transistor M2 has its drain connected to the base of switching transistor Q2, and its gate connected to ground. Diode D1 has its anode connected to the base of switching transistor Q1, and its cathode connected to the emitter of transistor Q15. Diode D2 has its anode connected to the base of switching transistor Q2, and its cathode connected to the emitter of transistor Q19. Resistor R13 is connected between the base of switching transistor Q1 and ground. Resistor R14 is connected between the base of switching transistor Q2 and ground.

Transistors M1 and M2 each provide a low resistance when turned on and a high resistance when turned off. Diode D1 and resistor R13 prevent the voltage drop across the drain-gate junction of transistor M1 from exceeding the threshold voltage, and thus prevent transistor M1 from turning on and drawing excessive current. Diode D2 and resistor R14 prevent the voltage drop across the drain-gate junction of transistor M2 from exceeding the threshold voltage, and thus prevent transistor M2 from turning on and drawing excessive current. After transistor Q15 is turned on, transistor Q18 is turned on which shunts current away from transistor Q9 as before. The voltage at the base of switching transistor Q1 is pulled up by transistor Q15 until diode D1 shuts off, at which time the base of switching transistor Q1 is connected to ground through resistor R13. In this way, the breakdown voltage of the base-emitter pn junction of switching transistor Q1 is not exceeded and transistor M1 remains turned off. After transistor Q19 is turned on, transistor Q22 is turned on which shunts current away from transistor Q11 as before. The voltage at the base of switching transistor Q2 is pulled up by transistor Q19 until diode D2 shuts off, at which time the base of switching transistor Q2 is connected to ground through resistor R14. In this way, the breakdown voltage of the base-emitter pn junction of switching transistor Q2 is not exceeded and transistor M2 remains turned off.

Although the present invention has been described with reference to preferred embodiments, workers skilled in the art will recognize that changes may be made in form and detail without departing from the spirit and scope of the invention.

What is claimed is:

1. A magnetic recording control circuit for controlling current through a magnetic recording head, the control circuit comprising:

first and second electrical power source node regions for connection to an electrical power source;

first and second magnetic recording head node regions for connection to the magnetic recording head;

at least one input signal node region for receiving input signals;

a switch network comprising:

a first switch having a conduction path between first and second conduction path regions which are connected in series between the first electrical power source node region and the first magnetic recording head node region, the first switch further having a control region responsive to control signals for controlling conduction through the conduction path;

a second switch having a conduction path between first and second conduction path regions which are connected in series between the first electrical power source node region and the second magnetic recording head node region, the second switch further having a control region responsive to control signals for controlling conduction through the conduction path;

a third switch having a conduction path between first and second conduction path regions which are connected in series between the first magnetic recording head node region and the second electrical power source node region, the third switch further having a control region responsive to control signals for controlling conduction through the conduction path; and a fourth switch having a conduction path between first and second conduction path regions which are connected in series between the second magnetic recording head node region and the second electrical power source node region, the fourth switch further having a control region responsive to control signals for controlling conduction through the conduction path;

a signal coupler having an input region connected to the input signal node region and a plurality of output regions each connected to the control region of a corresponding one of said first, second, third, and fourth switches, wherein the signal coupler provides control signals at at least one output region as a function of the received input signals at the input region; and a current reducer connected to the first magnetic head node region for reducing the current drawn by the signal coupler.

2. The control circuit of claim 1 wherein each of the switches are bipolar junction transistors having a collector, an emitter, and a base and wherein the collector is the first conduction path region, the emitter is the second conduction path region, and the base is the control region.

3. The control circuit of claim 1 wherein the signal coupler comprises:

an input current switch having a conduction path between first and second conduction path regions which are connected in series and the first conduction path region is connected to the first electrical power source node region, the input current switch further having a control region connected to the input region of the signal coupler; and a current controller connected between the second conduction path region of the input current switch and the control region of the third switch for controlling the current through the third switch.

4. The control circuit of claim 3 and further comprising a current generator connected to the signal coupler in series between the first and second electrical power source node regions.

5. The control circuit of claim 4 wherein the current generator is connected between the first electrical power source node region and the first conduction path region of the input current switch.

6. The control circuit of claim 3 wherein the input current switch is a bipolar junction transistor having an emitter, a collector, and a base and wherein the emitter is the first conduction path region, the collector is the second conduction path region, and the base is the control region.

7. The control circuit of claim 3 wherein the current controller, coupled with the third switch, creates a current amplifier having an input region connected to the second conduction path region of the input current switch and an output region connected to the first magnetic recording head node region, wherein the current amplifier provides more current at the output region than is received at the input region.

8. The control circuit of claim 7 wherein the current controller comprises:

a controller switch having a conduction path between first and second conduction path regions which are connected in series and the first conduction path region is connected to the second conduction path region of the input current switch, the controller switch further having a control region connected to its first conduction path region and also the control region of the third switch;

a first resistor connected between the second conduction path region of the controller switch and the second electrical power source node region; and a second resistor connected between the second conduction path region of the third switch and the second electrical power source node region.

9. The control circuit of claim 8 wherein the controller switch is a bipolar junction transistor having a collector, an emitter, and a base and wherein the collector is the first conduction path region, the emitter is the second conduction path region, and the base is the control region.

10. The control circuit of claim 1 wherein the current reducer comprises:

an activator having an input region connected to the first magnetic recording head node region and an output region, wherein the activator provides control signals at the output region as a function of the received voltages at the input region; and a reducer switch having a conduction path between first and second conduction path regions which are connected in series between the input region of the current amplifier and the second electrical power source node region, the reducer switch further having a control region connected to the output region of the activator.

11. The control circuit of claim 10 wherein the activator comprises:

an activator switch having a conduction path between first and second conduction path regions which are connected in series and the second conduction path region is connected to the control region of the first switch, the activator switch further having a control region connected to the first magnetic recording head node region;

a first mirror switch having a conduction path between first and second conduction path regions which are connected in series between the first electrical power source node region and the first conduction path region of the activator switch, the first mirror switch further having a control region connected to its second conduction path region;

a second mirror switch having a conduction path between first and second conduction path regions which are connected in series between the first electrical power source node region and the control region of the reducer switch, the second mirror switch further having a control region connected to the control region of the first mirror switch; and a resistor connected between the control region of the reducer switch and the second electrical power source node region.

12. The control circuit of claim 11 wherein the activator switch is a bipolar junction transistor having a collector, an emitter, and a base and wherein the collector is the first conduction path region, the emitter is the second conduction path region, and the base is the control region.

13. The control circuit of claim 11 wherein the first and second mirror switches are bipolar junction transistors having an emitter, a collector, and a base and wherein the emitter is the first conduction path region, the collector is the second conduction path region, and the base is the control region.

14. The control circuit of claim 10 wherein the reducer switch is a Schottky transistor having a collector, an emitter, and a base and wherein the collector is the first conduction path region, the emitter is the second conduction path region, and the base is the control region.

15. The control circuit of claim 1 and further comprising a current generator connected to the signal coupler in series between the first and second electrical power source node regions.

16. The control circuit of claim 15 wherein the current generator is connected between the first electrical power source node region and the first conduction path region of the input signal switch.

17. The control circuit of claim 1 and further comprising a resistor connected between the first electrical power source node region and the output of the current amplifier.

18. The control circuit of claim 1 wherein the input signal switch is a bipolar junction transistor having an emitter, a collector, and a base and wherein the emitter is the first conduction path region, the collector is the second conduction path region, and the base is the control region.

19. The control circuit of claim 1 wherein the current amplifier comprises:
a first amplifier switch having a conduction path between first and second conduction path regions which are connected in series and the first conduction path region is connected to the input region of the current amplifier, the first switch further having a control region connected to its first conduction path region;
a second amplifier switch having a conduction path between first and second conduction path regions which are connected in series and the first conduction path region is connected to the output region of the current amplifier, the second switch further having a control region connected to the control region of the first switch;
a first resistor connected between the second conduction path region of the first amplifier switch and the second electrical power source node region; and
a second resistor connected between the second conduction path region of the second amplifier switch and the second electrical power source node region.

20. The control circuit of claim 19 wherein the first and second amplifier switches are Schottky transistors having a collector, an emitter, and a base and wherein the collector is the first conduction path region, the emitter is the second conduction path region, and the base is the control region.

21. A magnetic recording control circuit for controlling current through a magnetic recording head, the control circuit comprising:
first and second electrical power source node regions for connection to an electrical power source;
first and second magnetic recording head node regions for connection to the magnetic recording head;
at least one input signal node region for receiving input signals;
a switch network comprising:
a first switch having a conduction path between first and second conduction path regions which are connected in series between the first electrical power source node region and the first magnetic recording head node region, the first switch further having a control region responsive to control signals for controlling conduction through the conduction path;
a second switch having a conduction path between first and second conduction path regions which are connected in series between the first electrical power source node region and the second magnetic recording head node region, the second switch further having a control region responsive to control signals for controlling conduction through the conduction path;
a third switch having a conduction path between first and second conduction path regions which are connected in series between the first magnetic recording head node region and the second electrical power source node region, the third switch further having a control region responsive to control signals for controlling conduction through the conduction path; and
a fourth switch having a conduction path between first and second conduction path regions which are connected in series between the second magnetic recording head node region and the second electrical power source node region, the fourth switch further having a control region responsive to control signals for controlling conduction through the conduction path;
a signal coupler having an input region connected to the input signal node region and a plurality of output regions each connected to the control region of a corresponding one of said first, second, third, and fourth switches, wherein the signal coupler provides control signals at at least one output region as a function of the received input signals at the input region, and wherein the signal coupler comprises:
an input signal switch having a conduction path between first and second conduction path regions which are connected in series and the first conduction path region is connected to the first electrical power source node region, the input signal switch further having a control region connected to the input region of the signal coupler; and
a current amplifier having an input region connected to the second conduction path region of the input signal switch and an output region connected to the control region of the first switch, wherein the current amplifier provides more current at the output region than is received at the input region; and
a current reducer connected to the first magnetic head node region for shunting current away from the signal coupler.

22. The control circuit of claim 21 and further comprising a current generator connected to the signal coupler in series between the first and second electrical power source node regions.

23. The control circuit of claim 22 wherein the current generator is connected between the first electrical power source node region and the first conduction path region of the input signal switch.

24. The control circuit of claim 21 and further comprising a resistor connected between the first electrical power source node region and the output of the current amplifier.

25. The control circuit of claim 21 wherein the input signal switch is a bipolar junction transistor having an emitter, a collector, and a base and wherein the emitter is the first conduction path region, the collector is the second conduction path region, and the base is the control region.

26. The control circuit of claim 21 wherein the current amplifier comprises:
a first amplifier switch having a conduction path between first and second conduction path regions which are connected in series and the first conduction path region is connected to the input region of the current amplifier, the first switch further having a control region connected to its first conduction path region;
a second amplifier switch having a conduction path between first and second conduction path regions which are connected in series and the first conduction path region is connected to the output region of the current amplifier, the second switch further having a control region connected to the control region of the first switch;
a first resistor connected between the second conduction path region of the first amplifier switch and the second electrical power source node region; and a second resistor connected between the second conduction path region of the second amplifier switch and the second electrical power source node region.

27. The control circuit of claim 26 wherein the first and second amplifier switches are Schottky transistors having a collector, an emitter, and a base and wherein the collector is the first conduction path region, the emitter is the second conduction path region, and the base is the control region.

28. A magnetic recording control circuit for controlling current through a magnetic recording head, the control circuit comprising:

first and second electrical power source node regions for connection to an electrical power source;

first and second magnetic recording head node regions for connection to the magnetic recording head;

at least one input signal node region for receiving input signals;

a switch network comprising:
  a first switch having a conduction path between first and second conduction path regions which are connected in series between the first electrical power source node region and the first magnetic recording head node region, the first switch further having a control region responsive to control signals for controlling conduction through the conduction path;
  a second switch having a conduction path between first and second conduction path regions which are connected in series between the first electrical power source node region and the second magnetic recording head node region, the second switch further having a control region responsive to control signals for controlling conduction through the conduction path;
  a third switch having a conduction path between first and second conduction path regions which are connected in series between the first magnetic recording head node region and the second electrical power source node region, the third switch further having a control region responsive to control signals for controlling conduction through the conduction path; and
  a fourth switch having a conduction path between first and second conduction path regions which are connected in series between the second magnetic recording head node region and the second electrical power source node region, the fourth switch further having a control region responsive to control signals for controlling conduction through the conduction path;

a signal coupler having an input region connected to the input signal node region and a plurality of output regions each connected to the control region of a corresponding one of said first, second, third, and fourth switches, wherein the signal coupler provides control signals at at least one output region as a function of the received input signals at the input region, and wherein the signal coupler comprises:
  an input current switch having a conduction path between first and second conduction path regions which are connected in series and the first conduction path region is connected to the first electrical power source node region, the input current switch further having a control region connected to the input region of the signal coupler; and
  a current controller connected between the second conduction path region of the input current switch and the control region of the third switch for controlling the current through the third switch; and a current reducer connected to the first magnetic head node region for shunting current away from the signal coupler.

29. The control circuit of claim 28 and further comprising a current generator connected to the signal coupler in series between the first and second electrical power source node regions.

30. The control circuit of claim 29 wherein the current generator is connected between the first electrical power source node region and the first conduction path region of the input current switch.

31. The control circuit of claim 28 wherein the input current switch is a bipolar junction transistor having an emitter, a collector, and a base and wherein the emitter is the first conduction path region, the collector is the second conduction path region, and the base is the control region.

32. The control circuit of claim 28 wherein the current controller, coupled with the third switch, creates a current amplifier having an input region connected to the second conduction path region of the input current switch and an output region connected to the first magnetic recording head node region, wherein the current amplifier provides more current at the output region than is received at the input region.

33. The control circuit of claim 32 wherein the current controller comprises:

a controller switch having a conduction path between first and second conduction path regions which are connected in series and the first conduction path region is connected to the second conduction path region of the input current switch, the controller switch further having a control region connected to its first conduction path region and also the control region of the third switch;

a first resistor connected between the second conduction path region of the controller switch and the second electrical power source node region; and a second resistor connected between the second conduction path region of the third switch and the second electrical power source node region.

34. The control circuit of claim 33 wherein the controller switch is a bipolar junction transistor having a collector, an emitter, and a base and wherein the collector is the first conduction path region, the emitter is the second conduction path region, and the base is the control region.

35. A magnetic recording control circuit for controlling current through a magnetic recording head, the control circuit comprising:

first and second electrical power source node regions for connection to an electrical power source;

first and second magnetic recording head node regions for connection to the magnetic recording head;

at least one input signal node region for receiving input signals;

a switch network comprising:
  a first switch having a conduction path between first and second conduction path regions which are connected in series between the first electrical power source node region and the first magnetic recording head node region, the first switch further having a control region responsive to control signals for controlling conduction through the conduction path;
  a second switch having a conduction path between first and second conduction path regions which are connected in series between the first electrical power source node region and the second magnetic recording head node region, the second switch further having a control region responsive to control signals for controlling conduction through the conduction path;

a third switch having a conduction path between first and second conduction path regions which are connected in series between the first magnetic recording head node region and the second electrical power source node region, the third switch further having a control region responsive to control signals for controlling conduction through the conduction path; and a fourth switch having a conduction path between first and second conduction path regions which are connected in series between the second magnetic recording head node region and the second electrical power source node region, the fourth switch fer having a control region responsive to control signals for controlling conduction through the conduction path;

a signal coupler having an input region connected to the input signal node region and a plurality of output regions each connected to the control region of a corresponding one of said first, second, third, and fourth switches, wherein the signal coupler provides control signals at at least one output region as a function of the received input signals at the input region; and a current reducer connected to the first magnetic head node region for shunting current away from the signal coupler, wherein the current reducer comprises:

an activator having an input region connected to the first magnetic recording head node region and an output region, wherein the activator provides control signals at the output region as a function of the received voltages at the input region; and a reducer switch having a conduction path between first and second conduction path regions which are connected in series between the input region of the current amplifier and the second electrical power source node region, the reducer switch further having a control region connected to the output region of the activator.

36. The control circuit of claim 35 wherein the activator comprises:

an activator switch having a conduction path between first and second conduction path regions which are connected in series and the second conduction path region is connected to the control region of the first switch, the activator switch further having a control region connected to the first magnetic recording head node region;

a first mirror switch having a conduction path between first and second conduction path regions which are connected in series between the first electrical power source node region and the first conduction path region of the activator switch, the first mirror switch further having a control region connected to its second conduction path region;

a second mirror switch having a conduction path between first and second conduction path regions which are connected in series between the first electrical power source node region and the control region of the reducer switch, the second mirror switch further having a control region connected to the control region of the first mirror switch; and a resistor connected between the control region of the reducer switch and the second electrical power source node region.

37. The control circuit of claim 36 wherein the activator switch is a bipolar junction transistor having a collector, an emitter, and a base and wherein the collector is the first conduction path region, the emitter is the second conduction path region, and the base is the control region.

38. The control circuit of claim 36 wherein the first and second mirror switches are bipolar junction transistors having an emitter, a collector, and a base and wherein the emitter is the first conduction path region, the collector is the second conduction path region, and the base is the control region.

39. The control circuit of claim 35 wherein the reducer switch is a Schottky transistor having a collector, an emitter, and a base and wherein the collector is the first conduction path region, the emitter is the second conduction path region, and the base is the control region.

* * * * *

UNITED STATES PATENT AND TRADEMARK OFFICE
CERTIFICATE OF CORRECTION

PATENT NO. : 6,297,922 B1
DATED : October 2, 2001
INVENTOR(S) : Jeremy R. Kuehlwein It is certified that error appears in the above-identified patent and that said Letters Patent is hereby corrected as shown below:

<u>Column 3,</u>
Line 53, delete "circuit 10", insert -- circuit 20 --

<u>Column 5,</u>
Line 11, delete "npnbipolarjunction", insert -- npn bipolar junction --

<u>Column 7,</u>
Line 10, delete "V1-R1I2R/R4-VBE", insert -- V1-R1I2R3/R4-VBE --

<u>Column 8,</u>
Line 9, delete "trough", insert -- through --.

<u>Column 9,</u>
Line 19, delete "offand", insert -- off and --

<u>Column 11,</u>
Line 45, delete "24 differs", insert -- 24' differs --

Signed and Sealed this

Eleventh Day of June, 2002

*Attest:*

JAMES E. ROGAN
*Attesting Officer*       *Director of the United States Patent and Trademark Office*